April 19, 1960 C. A. CAMPBELL 2,933,559

SYMBOL WRITING RECORDER

Filed June 6, 1956 2 Sheets-Sheet 1

INVENTOR.
Charles A. Campbell
BY
Hyman Hurvitz
Attorney.

April 19, 1960 C. A. CAMPBELL 2,933,559

SYMBOL WRITING RECORDER

Filed June 6, 1956 2 Sheets-Sheet 2

INVENTOR.
Charles A. Campbell
BY Hyman Hurwitz
Attorney.

United States Patent Office 2,933,559

Patented Apr. 19, 1960

2,933,559

SYMBOL WRITING RECORDER

Charles A. Campbell, Melbourne, Fla.

Application June 6, 1956, Serial No. 589,768

14 Claims. (Cl. 178—30)

The present invention relates to recording systems for recording letters, numbers and other symbols and characters required for the presentation of information and more particularly to a high speed electronic recording system utilizing a plurality of fixed recording styli for recording information in the form of symbols or characters on a moving record receiving medium.

Conventional prior art symbol generators utilize mechanically moving parts for tracing or drawing on a visual record medium. Systems of this type include devices employing motor driven pen recorders, galvanometer-deflected mirrors and movable electrical styli as the writing elements. In systems of this type recording speeds are severely limited by mechanical inertia of the writing elements. In addition, particularly in optical systems, the time required for developing makes the recorded information unavailable for information processing for a considerable period of time after completion of recording.

Although difficulty has been experienced in designing practical high speed electrical writing devices, it is desirable to provide information in symbolic form since in such form it is readily available for data reduction and other processing.

Briefly describing an apparatus in accordance with the present invention there is provided an electronic system for energizing selected ones of a plurality of aligned conductive styli, for marking an electrosensitive record medium such as Teledeltos paper. The record medium is driven at a predetermined speed with respect to the styli, which are arranged in a row transverse to the direction of movement of the record, the lateral positions of the styli defining columns extending parallel to the direction of movement of the paper. Selected styli are energized simultaneously at predetermined equally spaced time intervals, the indications recorded on the record medium during each interval being thus arranged in transverse rows. A predetermined number of rows are assigned to each character, the rows together with the columns defined by the styli positions constituting a symbol raster. The term symbol raster, as hereinafter employed in the specification, refers to a geometrical configuration having a predetermined number of equally spaced, mutually perpendicular rows and columns, characters being formed by selectively recording elemental indications at the intersections of the rows and columns; that is, the styli are energized selectively to mark the electrosensitive record medium at the intersections of the rows and columns. For purposes of illustration only, a symbol raster of six rows and five columns is employed, thus providing thirty locations which may be selectively marked to develop any single digit number, letter or other symbol or character. Characters are recorded by sequentially and successively applying predetermined patterns of voltage pulses to the fixed recording styli at equally spaced time intervals. The pattern of voltage pulses developed at each time interval may constitute from one to five pulses, each pulse being applied to a distinct stylus, the pattern of pulses recorded during each interval corresponding to the arrangement of elemental indications required in a particular row, to form, with the indications recorded in the remaining rows of the symbol raster, the desired character.

The apparatus employed for generating the required patterns of voltage pulses includes a hollow generally opaque drum or cylinder, rotated about its axis at a predetermined speed. The various characters to be recorded appear in bands of elementary transparent areas, each extending about the circumference of the drum, the several bands each assigned a different character, or symbol, and being displaced along the axial dimension of the cylinder, i.e., the symbols in each band being the same, and the symbols in different bands being different. The transparent areas of each symbol are arranged on the drum in accordance with a six row-five column raster geometrically similar to the symbol raster of the recorded characters, the columns of the raster on the drum being parallel to the direction of rotation thereof. A source of light is disposed centrally of the drum and a distinct group of five photocells is disposed adjacent each band of symbols on the drum, there being one photocell for each column. The photocells are aligned axially of the drum so that each group senses the transparent areas of each row of its associated raster, and senses the rows in succession. The output voltage pulses thus developed by each photocell is applied to one input lead of a separate dual input coincidence gate, each group of photocells having five such gates, and each gate connected to receive voltage pulses from a distinct photocell of its associated group of photocells. Each one of the input leads and the corresponding output lead of each coincidence gate are connected, respectively, to one photocell and one stylus, associated with corresponding columns of the raster on the drum and the record medium. The corresponding output leads of the distinct groups of gates are connected in parallel, so that by selectively opening the groups of coincidence gates, the various characters disposed on the drum may be selectively recorded.

When it is desired to record simultaneously in plural recording channels, i.e., by means of plural groups of styli, from signal impulses deriving from a single group of photocells, the photocells are connected to parallel groups of gating circuits, each group of gating circuits leading to a different group of styli. Selective or simultaneous recording in the separate recording channels may then be accomplished by selectively or simultaneously opening the groups of gating circuits, to channel signals deriving from the photocells to selected groups of styli.

In order to write any desired character, it is essential merely to open a corresponding one of the groups of gates. Control circuits, for selectively opening the groups of gates employ digital pulses, deriving from some external source, such as a computer. The control circuitry receives the digital pulses, which dictate the characters to be recorded, and converts the information to a pulse applied to that group of coincidence gates which is associated with the photocells which develop the pattern of recording pulses required to record the desired character.

It is, accordingly, an object of the present invention to provide a high speed symbol recording system which does not depend upon a moving writing element for writing the symbols.

It is another object of the present invention to provide a high speed recording system utilizing a plurality of fixed styli for recording on an electro-sensitive recording medium.

It is another object of the present invention to provide a high speed recording system for converting coded groups of command pulses into symbols representing pulse patterns, and applying the latter in controlled sequence in relation to plural stationary recording styli, whereby to record on a record medium a plurality of elemental indications, the composite of which presents to the eye, symbols readily recognizable as various numerals, letters or other configurations necessary to the presentation of information in the form of characters.

It is another object of the present invention to provide a symbol writing recorder having a plurality of groups of fixed styli concurrently recording in a plurality of channels on a recording medium and utilizing a single source of voltage patterns for energizing the groups of styli to print any of a plurality of desired symbols in each channel, and further utilizing distinct sources of gating voltages for the styli of each channel selectively to determine the pattern of voltages to be supplied to each group of recording styli.

It is another object of the present invention to record characters in the form of elemental indications at the intersections of a plurality of rows and columns of a symbol raster, and for simultaneously recording the elemental indications of each row, and sequentially and successively recording the elemental indications in successive rows, to present a composite pattern of elemental indications which present characters to the eye of an observer.

It is another object of the present invention to provide a symbol writing generator which may convert a wide variety of pulse code representations into visual symbols which convey to the eye of an observer various predeterminable numbers, letters and other symbols.

The above and still further features, objects and advantages of the invention will become apparent upon consideration of the following detailed description of several specific embodiments of the invention, especially when taken in conjunction with the accompanying drawings, wherein—

Figure 1:
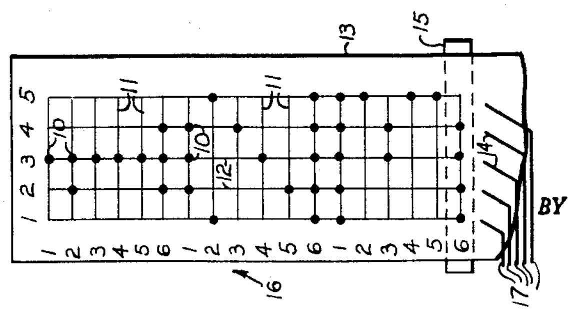
Figure 1 is an illustration of the format of recorded characters produced by the system of the present invention.

Referring to Figure 1 of the accompanying drawings, the symbols to be recorded are developed by selectively recording elemental indications 10 at the intersections of equally spaced rows 11 and columns 12 of a six-by-five symbol raster. The symbols illustrated in Figure 1 are the numerals one, two and three and although the numerals are illustrated throughout the various figures, it is not intended to limit the type of symbol to be recorded, the system of the present invention being adapted to record numbers, letters or any other symbols which may be useful in presenting information. The six rows 11 of the raster lie in the horizontal plane as viewed in Figure 1, while the five raster columns 12 lie in the vertical plane. The numeral one is developed by recording elemental indications 10 in the third column of row one, in the second and third columns of row two, in the third column of rows three, four and five and in the second, third and fourth columns of row six, the number of each row and column being indicated by the numerals lying to the left and above, respectively, the rows and columns 11 and 12. The numeral two is developed by recording elemental indications 10 in the second, third and fourth columns of row one, the first and fifth columns of row two, the fourth, third and second columns, respectively, of rows three, four and five and all columns of row 6. Similarly, the numeral three, and any other symbol necessary to complete presentation of information, may be developed by the appropriate placement of elemental indications 10 at the intersection of the six rows 11 and five columns of the symbol raster. Although a five-by-six raster is illustrated in Figure 1, and referred to throughout the specification, symbol rasters having different numbers of rows and columns, may be utilized within the scope of the present invention.

The symbols are recorded on an electrosensitive record medium 13, such as Teledeltos paper, by means of a row of conductive styli 14. It is a well known property of Teledeltos paper that a dark indication is produced thereon in response to the passage of current therethrough. The record medium 13 is moved, by a conventional drive mechanism, not illustrated, vertically upward as viewed in Figure 1, as indicated by the arrow 16. The rows of the symbol raster are disposed transverse to the direction of movement of the record medium 13, as is the row of styli 14. The row of styli 14 includes one stylus positioned to transverse each column 12 of the symbol raster, the styli 14 being selective energized by the generation of predeterminable patterns of voltage pulses on leads 17, each connected to a different one of the styli 14. Movement of the record medium 13 effects the sequential and successive passage of each row 11 of the symbol raster between the styli 14 and the platen 15 and the symbols are developed by sequentially and successively energizing selected styli 14 as each row of the raster passes under the styli, a complete symbol being determined when six successive rows of the raster have passed under the styli and have had elemental indications 10 recorded in appropriate columns. Although only a single column of symbols is illustrated in Figure 1, additional columns of symbols may be developed by providing additional styli 14 collinear with those illustrated.

Figure 2:
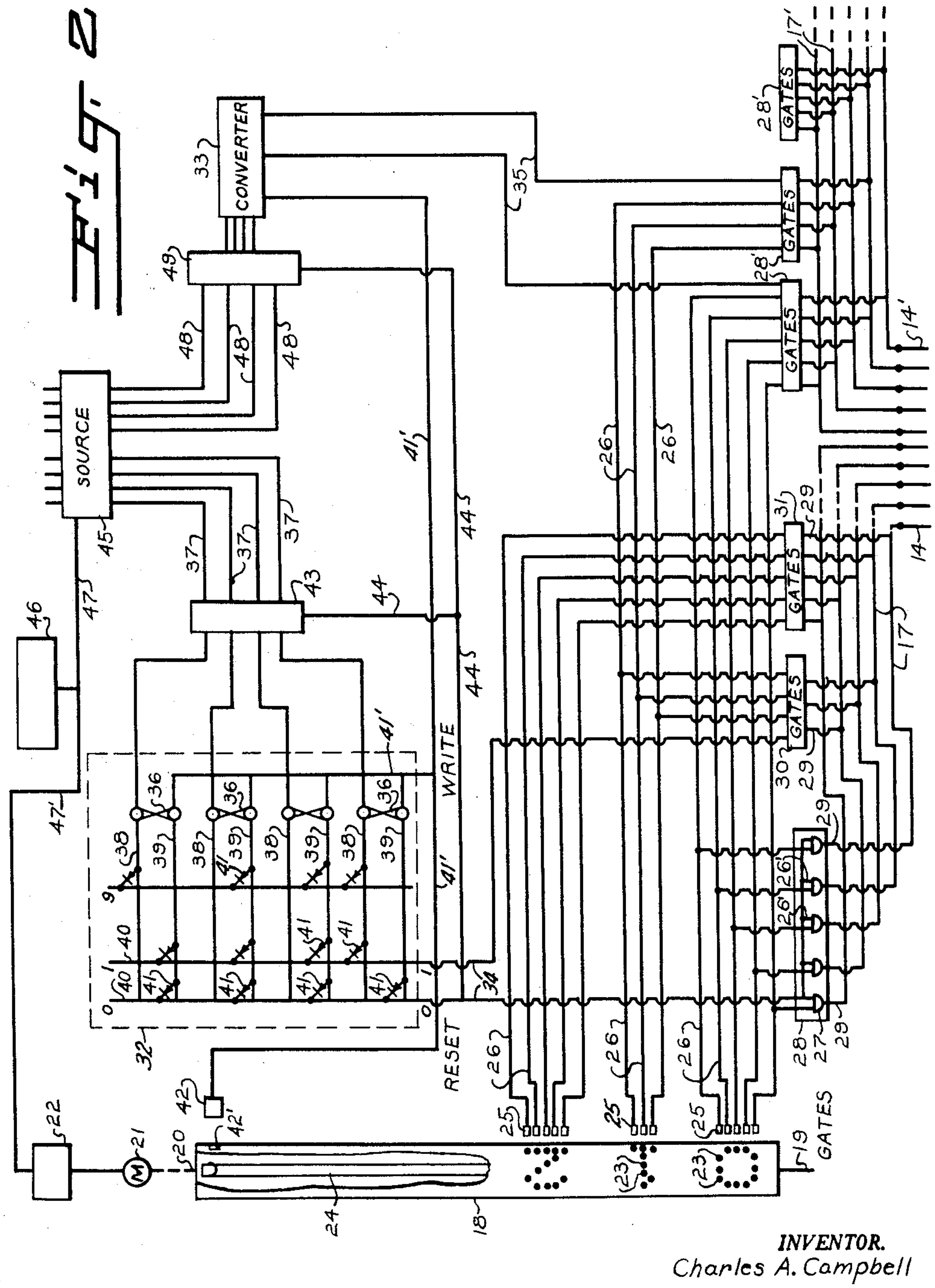
Figure 2 is a schematic circuit diagram of one embodiment of the present invention.

As previously indicated, the particular symbol developed on the record medium 13 is determined by the pattern of voltage pulses developed on the leads 17 as each row 11 of the symbol raster is presented to the styli 14. The apparatus in accordance with one embodiment of the present invention for selectively energizing the styli 14 is illustrated in Figure 2 of the accompanying drawings. Referring specifically to Figure 2, a hollow and opaque drum 18 is mounted for rotation about its longitudinal axis on two end shafts 19 and 20. The shaft 20 is connected by suitable mechanical means to be driven by synchronous motor 21, conventionally illustrated, which receives alternating current voltage from a source 22. The various symbols to be recorded on the record medium 13, illustrated in Figure 1 of the accompanying drawings, appear as bands of transparent areas 23 about the circumference of the hollow cylinder 18, the various bands of symbols being displaced along the longitudinal dimensions of the drum 18 and the symbols in each band being identical. The number of symbols surrounding the drum in a given band and the spacing between them around the circumference of the drum 18 determines the rate at which the characters are generated on the record medium 13. The transparent areas 23 of each symbol on the hollow drum 18 are arranged in a six-by-five raster which is geometrically similar to the raster of the symbols appearing on the record medium 13, that is, the transparent areas 23 are disposed at the intersection of the rows and columns of a six-by-five raster. Thus, for a particular symbol, the pattern of transparent areas 23 on the drum 18 is identical with the pattern of elemental areas 10 recorded on the record medium 13. This is readily seen by a reference to Figures 1 and 2 of the accompanying drawings wherein the arrangement of transparent areas 23 of the numeral 1 in Figure 2 is identical with the arrangement of elemental indications 10 of the numeral 1 in Figure 1; although the raster in Figure 2 is smaller than the raster in Figure 1.

A source of illumination 24, conventionally illustrated in Figure 2, is disposed along the axis of the cylinder 18 and may be rotatable therewith. The source of illumination 24 is nonstroboscopic and, therefore, provides a constant source of light which shines through the transparent areas 23 on the circumference of the cylinder 18. A row of photocells 25 is disposed adjacent each band of symbols on the circumference of the cylinder 18 and each row comprises five photocells 25, disposed parallel to the longitudinal axis of the drum 18. Each photocell is positioned adjacent a different column of the symbol raster and produces output voltage pulses on an associated lead 26 upon the passage of a transparent area 23 between the light source 24 and the cell 25. The rows of photocells 25 for investigating each of the symbols on the cylinder 18 are collinear and five photocells are provided for examining each symbol, except the symbol 1, which requires only three photocells since transparent areas 23 appear in only the center three columns of the raster. Upon rotation of the cylinder 18, each row of transparent areas is sequentially and successively passed between the light source 24 and the photocells 25 produce a pattern of voltages on their associated output leads 26 in accordance with the arrangement of the transparent areas 23 in the columns of each row. The rows are sequentially and successively interrogated and the rotational speed of the cylinder 18 is coordinated with the movement of the record medium 13 as will, hereinafter, be described so that appropriate spacing is obtained between the elemental indications 10 in each of the rows of the symbol raster on the record medium 13. The cylinder 18, the source of light 24 and the photocells 25 constitute the sole source of signal voltages for the system regardless of the number of channels of information which are to be simultaneously recorded.

Each of the leads 26 connected to the photocells 25 associated with the numeral "0" is connected to a distinct dual input coincidence gate 27 of a first plurality of five coincidence gates 28. The gates 27 are provided with a second input lead 26' and output leads 29 each connected to a distinct lead 17 adapted to supply voltage pulses to the styli 14. The output lead 29 and the input lead 26 of each gate 27 are connected respectively with a stylus 14 and a photocell 25 associated with corresponding columns of the symbol raster on the record medium 13 and the symbol raster of the numeral 0 on the drum 18. The photocells of each of the other symbols on the drum 18 are connected over separate groups of leads 26 to further groups of coincidence gates, only those associated with numerals "1" and "2" being illustrated and identified by reference numerals 30 and 31, the output lead 29 and input lead 26 of each coincidence gate being connected to the stylus 14 and photocell 25 associated with corresponding columns of the symbol rasters on the record 13 and the drum 18.

The circuitry thus far described is suitable for energizing the styli associated with only a single column on the record medium 13. For recording in an additional column of the record medium 13, there may be provided a further group of styli 14', the energization of which is controlled by additional groups 28' of coincidence gates, only three of which are illustrated in Figure 2. Each of the groups of gates 28' is connected over leads 26 to the photocells 25 and over separate groups of output leads 29' to leads 17' connected to the styli 14'. The interconnection between the various gates 28', the photocells 25 and the styli 14' is the same as the interconnection between the gates 28, 30 and 31, the photocells 25 and the styli 14 so that the leads 26 and 29' of each gate are connected to the photocell 25 and stylus 14' associated with corresponding columns of the rasters on the record medium 13 and the drum 18 respectively.

Normally, the coincidence gates 27 prevent any of the pulses developed by the photocells 25 from reaching any of the sets of styli 14 and 14' since the appearance of voltage pulses on leads 26 energize only one input lead of the gates 27. Selection of the particular row of photocells 25 to be connected to the groups of styli 14 and 14' is affected by converters 32 and 33, the converter 32 being illustrated as a binary-to-analog position converter and the converter 33 being illustrated in block form; it being intended that the converter 33 is identical with the converter 32. The converter 32 is provided with a plurality of output leads 34, each lead 34 being connected to the second input leads 26' of each coincidence gate 27 of a distinct group of coincidence gates such as groups of gates 28, 30, 31, etc. Thus the lead 34 designated by the numeral "0" to the left thereof is connected in parallel to the five input leads 26' of the group of gates 28 associated with the symbol raster for the numeral zero on the drum 18. Consequently, if the converter 32 develops a voltage on the output lead 34, indicated by the numeral zero, voltage pulses developed by the photocells 25 associated with the zero symbol raster are gated to the styli 14 over the leads 17. If a voltage is developed by the converter 32 on the output lead 34, indicated by the numeral 1 appearing at the left thereof, voltage pulses from the photocells 25 associated with the symbol one are gated through the group of coincidence gates 30 to the center three leads 17 associated with the styli 14. Consequently, the converters 32 and 33 determine the information recorded on the record medium 13 at any particular instant.

Proceeding to a description of a converter suitable for utilization in the system of the present invention, the converter 32, and also the converter 33, comprises four flip-flops 36, conventionally illustrated, adapted to receive binary coded voltage pulses over four input leads 37, each lead 37 being connected to one input circuit of a distinct flip-flop 36. The flip-flops 36 are bistable elements having two states of conduction hereinafter designated as the A and B states. Each flip-flop 36 is provided with two output leads 38 and 39, illustrated as a horizontal array of leads, the interconnection of the flip-flops 36 and leads 38 and 39 being such that when a flip-flop 36 is in the A state of conduction, a voltage is applied to its associated lead 39 and when the flip-flop 36 is in the B state of conduction a voltage is applied to its associated lead 38.

The converter 32 further comprises a vertical array of leads 40, each lead 40 being connected to a distinct one of the output leads 34 of the converter 32. Each lead 40 is connected through four diodes 41 to four of the eight horizontal leads 38 and 39, the interconnection between the leads 40 and four of the leads 38 and 39 determining which of the leads 40 and, therefore, which of the output leads 34 has a voltage applied thereto. The lead 40 indicated by the numeral zero at the left and top of the lead is connected through four diodes 41 to each of the leads 39. When all of the flip-flops 36 are in the A state of conduction which is indicative of the number zero, a voltage is applied to this lead 40. The lead 40 indicated by the number 1 is connected through a diode 41 to the lead 38 associated with the lowermost flip-flop 1 and through three additional diodes 41 to the leads 39 associated with the remaining flip-flops 36. Thus, when the lowermost flip-flop 36 is in the B state of conduction and the remaining flip-flops are in the A state of conduction, this arrangement being indicative of the numeral 1, the lead 40 designated by the number 1 has a voltage applied thereto.

The interconnection between each of the leads 40 and leads 38 and 39 is such that each lead 40 is energized by a distinct pattern of voltages appearing on the leads 38 and 39. The third lead 40, illustrated in Figure 2 of the accompanying drawing, is designated by the numeral 9 and is connected through the diodes 41 to the leads 38 associated with the upper and lower flip-flops 36 and through diodes 41 to the leads 39 associated with the intermediate flip-flops 36. Thus when the flip-flops are in this condition, which is indicative of the number 9, the lead 40 bearing the numeral 9 is energized. As previously indicated each of the leads 40 is connected over a distinct lead 34 to one of the groups of coincidence gates 28, 30, 31, etc., associated with the first group of styli 14. Thus when a pattern of pulses appears on the leads 37 indicative of a particular number, the lead 34 energized by this pattern of pulses applies a gating voltage pulse to the group of coincidence gates which controls the presentation of information to the styli 14 indicative of the number represented by the pulses appearing on the leads 37.

Each of the flip-flops 36 is connected in parallel to a lead 41' upon which is developed a reset voltage pulse for resetting all of the flip-flops 36 to the A state of conduction upon the completion of recording of each symbol on the record medium 13. Voltages are developed on the lead 41' by a photocell 42 adapted to interrogate a transparent area 42' on the cylinder 18 positioned circumferentially between the groups of symbol rasters. During the interval when the photocells 25 are adjacent opaque areas only of the cylinder 18, a transparent area 42' of the cylinder is disposed between the light source 24 and the photocell 42 to produce a reset voltage pulse on the lead 41 which resets the flip-flops 36 to the A state of conduction. Thereafter, the flip-flops 36 may receive a next group of pulses over the leads 37 to prepare the system for recordation of a subsequent symbol. Inasmuch as the voltage developed on a specific output lead 34 of the converter 32 determines the information being printed by the styli 14, this voltage must be maintained on the lead 34 during the interval required for recording a single symbol. Therefore, a plurality of coincidence gates 43, illustrated as a block in Figure 2, are connected in the input leads 37 so that information may be gated to the flip-flop 36 only during intervals that all of the photocells 25 are adjacent opaque areas on the cylinder 18. Pulse code information generated by a source 45, is applied to the leads 37 and is selectively gated through the gates 43 by a gating voltage pulse appearing on a lead 44. In an embodiment of the invention wherein the source 45 produces selected voltage pulses on all of the leads 37 simultaneously, that is, in parallel time-wise, the voltage pulses for gating information through the gates 43 may be taken from the lead 34 adapted to indicate the numeral 0. When a voltage pulse appears on the lead 41', which resets the flip-flops 36, at the end of each symbol recording interval, the flip-flops are all set to the A state of conduction and a voltage pulse appears on the lead 34 indicated by the numeral "0" to the left thereof. The voltage pulse appearing on the lead 34 is applied on the lead 44 to the gates 43 and a new unit of information is gated to the flip-flops 36. The operation of the flip-flops 36 is sufficiently fast that the zero lead 34 does not remain energized long enough to effect the record medium 13.

As an alternative method of gating information to the flop-flops 36, the lead 44 may be energized by a further photocell adapted to investigate a transparent area on the drum 18 disposed between the area 42' and the next succeeding symbol raster. Since in the illustrated embodiment of the invention the photocell 42 controls resetting of the flip-flops 36 and over the lead 44, controls the gates 43, the gating of information from the source 45 to the converter 32 is under control of the cylinder 18. Consequently, means must be provided for synchronizing the rotation of the cylinder 18 with the presentation of information to the source of binary pulses 45. Otherwise, the information contained in the source 45 may be changing during the interval that information is gated therefrom to the converter 32. The desired synchronization is obtained by utilizing a source of sync signals 46 which supplies synchronizing voltage pulses over lead 47 to control the gating of information to the binary code source 45 and over the lead 47' to synchronize the source of voltage 22 for the synchronous motor 21. The pulses appearing on the leads 47 and 47' maintain the synchronous motor 21 and the binary voltage source 45 in step so that information in the source 45 may not be changed during an interval when this information is being gated to the converter 32.

The same source of binary information 45 which supplies information to the converter 32 over leads 37 also provides binary coded information to the converter 33 over the leads 48 and through a group of coincidence gates 49, illustrated as a block, to the converter 33. Inasmuch as the two groups of styli 14 and 14' record in adjacent columns on the record medium 13, the information recorded takes the form of a two numeral decimal number and, consequently, the source 45 may be a source of binary-decimal coded information. A binary-decimal code is a code in which each decimal digit is represented by a distinct group of four binary bits. Thus in the system illustrated in Figure 2 of the accompanying drawings, the four binary coded pulses appearing on the leads 37 may be indicative of the tens digit of a decimal number and the coded voltage pulses appearing on the leads 48 may be indicative of the units digits of a decimal number. The information supplied to the source 45 may be in the pure binary form and, the source 45 may take the form of a binary-to-binary-decimal converter which upon presentation of a binary number thereto applies a group of pulses to the leads 37 and 48 indicative of the units and tens numbers respectively. A binary-to-binary decimal converter suitable for utilization in the present invention is described and claimed in my copending application Serial Number 581,192, filed on April 27, 1956, now Patent No. 2,860,327 issued Nov. 11, 1958.

Proceeding with the description of the present invention, the converter 33 selects an appropriate group 28' of coincidence gates for controlling the styli 14' to produce the symbol indicative of the units digit of the information supplied to the source 45 while the converter 32 controls the gating of information through the groups 28, 30, 31, etc., of coincidence gates which control gating of information indicative of the tens digit to the group of styli 14.

In the operation of the system of the present invention the source of voltage 22 is turned on and the cylinder 18 is rotated by the motor 21. The motor 21 is synchronized with the presentation of information to the source 45 by voltage pulses appearing on the leads 47' which are developed by the source of sync signals 46. When the photocell 42 detects a transparent area on the cylinder 18, all of the flip-flops 36 of the converter 32 are reset to the A state of conduction and a voltage pulse appears on the lead 44. The voltage pulse on the lead 44 gates the information from the source 45 to the flip-flops 36 which assume various states of conduction in accordance with the pattern of pulses appearing on the leads 37. The pattern of conduction of the flip-flops 36 causes a voltage to be applied to one of the leads 34 which opens its associated group of coincidence gates and passes the voltage pulses developed by the photocells 25 to the styli 14. The voltage pulses developed by the photocells 25 determine the elemental areas 10 developed in each row of the symbol raster appearing on the record medium 13 in accordance with the numbers selected by the converter 32. Concurrently, the converter 33 selects one of its associated leads 35 and gates information from any one of the rows of photocells 25 to the second set of styli 14' which records the information in a second column of the record medium 13. Upon the completion of recording of these two symbols, the photocell 42 is again energized and resets the converters 32 and 33 to the zero state of conduction at which time a second cycle of operation is initiated.

Although the system illustrated in Figure 2 is adapted for use with a source 45 of binary-decimal information, it is not intended to limit the present invention to the utilization of a specific pulse code source. The system is equally applicable with slight modifications to accepting information from a source of Gray codes, Brown codes or pure binary codes. Further, although the system is illustrated as providing sufficient circuit elements for recording in only two columns of a record medium, it is apparent that by the addition of further groups of coincidence gates connected to the leads 26, and the addition of converters such as 32 and 33 and extension of the coded information available from the source 45, the system may be extended to record in any number of channels desired. However, only one source of symbol voltages is necessary regardless of the number of channels to be recorded. It will be noted that the photocells 25 are illustrated as driving the styli 14 directly through the coincidence gates. Where additional power is necessary, for driving the styli, power amplifiers may be inserted in each of the leads 26 or, alternatively, power amplifiers may be inserted in the leads 17.

The system illustrated in Figure 2 utilizes a distinct converter 32 or 33 for each channel of information to be recorded on the record medium 13; however, a single converter may be utilized for controlling all of the channels of information. The utilization of distinct converters is considered preferable since the number of circuit components involved in materially less than where a single converter is employed.

The symbol writing generator of the present invention provides a high speed all electronic printer utilizing no moving parts and requiring no subsequent processing of the record medium. The recording speed and frequency response of the system is not limited by the inertia of moving parts and there are no theoretical limits with respect to the maximum recording speed of the system. From a practical standpoint the speed of recording is determined by the rate at which the rows of the symbol raster on the drum 18 can be presented to the photocells 25. The hollow drum 18 may be made of very light weight material and therefore may be rotated at high speeds. By employing a cylinder having a large diameter and by closely spacing the rows of the symbol raster, extremely high speeds of recording may be obtained. By the utilization of vacuum photocells, the response time of the photocells 25 may be maintained at a minimum, thereby eliminating this factor as a consideration in the printing speeds available with the system of the present invention. Also, special computer tubes may be employed in the source 45 and the flip-flops 36 to minimize the response time of these elements. In one specific application of the invention, 525 styli are arranged in a row across a twelve inch recording medium to accomplish the simultaneous recordation of 105 characters. Printing is accomplished at a rate of 45,360 rows per minute which represents a recording system capable of generating 793,800 characters per minute.

Figure 3:
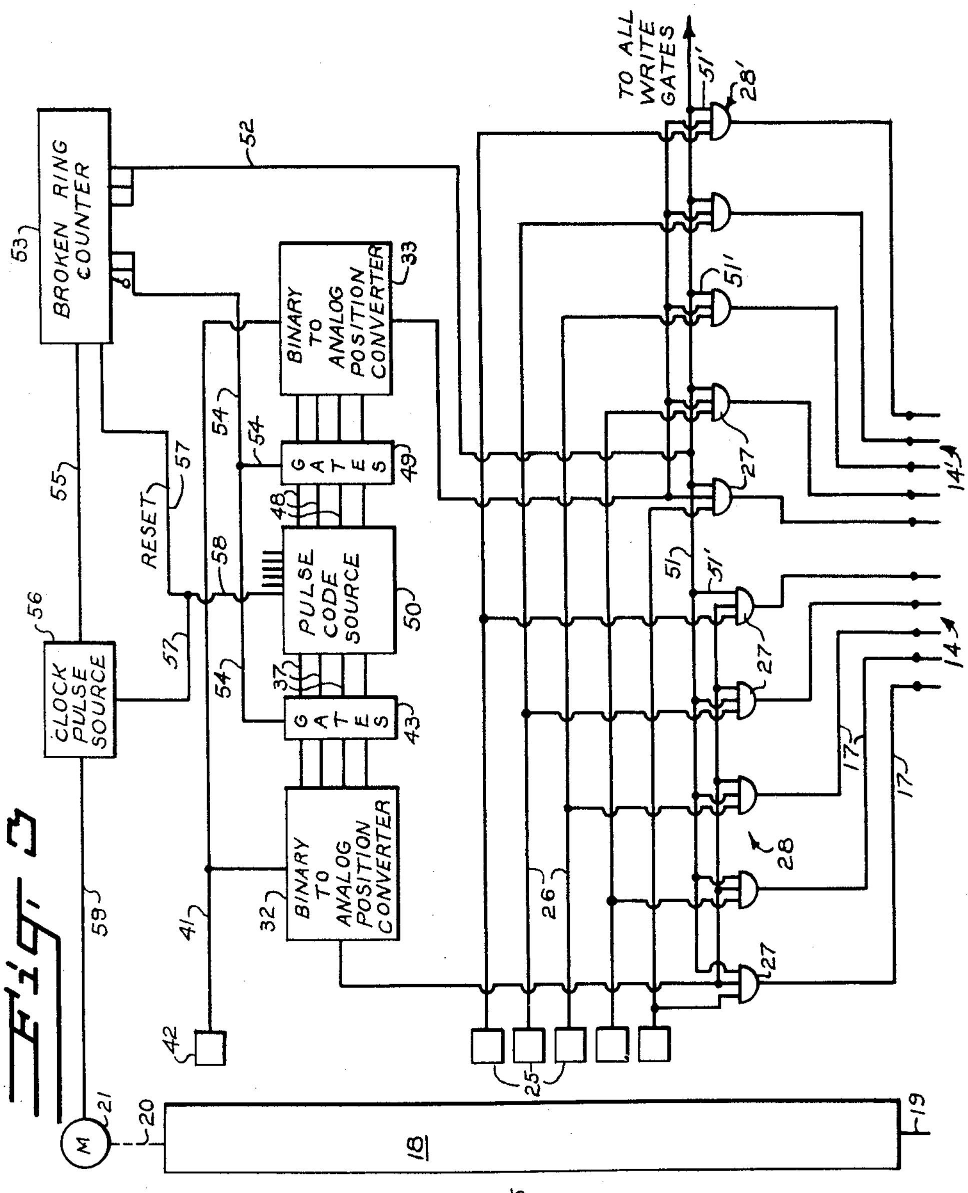
Figure 3 is a schematic circuit diagram of another embodiment of the present invention.

The embodiment of the invention illustrated in Figure 2 is adapted to receive binary coded voltage pulses from a source 45 supplying the coded voltage pulses to the converters 32 and 33 in parallel time-wise. In a second embodiment of the invention illustrated in Figure 3 of the accompanying drawings, the apparatus of the present invention is adapted to receive binary coded voltage pulses from a source 50 which supplies the binary coded voltage pulses in series, time-wise, so that the pulses appear sequentially and successively on the leads 37 and 48 with the pulse having the greatest weight in the code appearing first. Those elements of the circuit of Figure 3 which are common to Figures 2 and 3 carry the same reference numerals in both figures. In this figure only two sets of cooincidence gates 28 and 28' associated with the photocells 25 for sensing the symbol raster on the drum 18 are illustrated for the sake of simplicity, and each of the coincidence gates 27 are provided with a third input lead 51' connected in parallel to a lead 51. The lead 51 is connected over a further lead 52 to receive voltage pulses from the last three of six stages of a broken ring counter 53. The first stage of the counter 53 is unconnected while the second and third stages are connected in parallel and via a lead 54 to two groups of four coincidence gates 43 and 49, the lead 54 supplying gating voltage pulses to these groups of gates.

The broken ring counter 53 is stepped by successive voltage pulses appearing on a lead 55 connected to be energized by a clock pulse source 56. The clock pulse source 56 further provides appropriately timed voltage pulses on lead 57 for resetting the broken ring counter 53, on lead 58 for controlling the gating of information to the pulse code source 50, and on the lead 59 for synchronizing the voltage source 22, and, consequenty, the synchronous motor 21, with the operation of the remainder of the system. Inasmuch as the counter 53 is a broken ring counter, it is not self recycling and must be reset to a zero count after the application of six counting pulses. Consequently, a reset pulse appears on the lead 57 after the application of six successive counting pulses to the lead 55. Pulses are applied to the lead 59 as often as is considered necessary for maintaining the source 22 in synchronization with the broken ring counter 53 and pulses are applied to the lead 58 to gate information to the source 50 during the interval when the photocell 42 is generating reset pulses on the lead 41 for application to the converters 32 and 33.

At the beginning of each cycle a reset pulse appears on the lead 41 at the same time that a reset pulse appears on the lead for 57 so that the converters 32 and 33 and the broken ring counter 53 are reset at the same instant. Also, during this interval, information from a source, not illustrated, is gated by a pulse on lead 58 to the pulse code source 50 for subsequent distribution to the various converters 32 and 33 over the leads 37 and 48 respectively. The appearance of the second and third pulses on the lead 55 steps the broken ring counter through its second and third stages thereby energizing the lead 54 to gate the two groups of four information pulses from the pulse code source 50 to the binary-to-analog-position converters 32 and 33 respectively. The fourth through sixth pulses applied to the lead 55 steps the counter 53 through its fourth to sixth and last stage and, a gating voltage is supplied via leads 52 and 51 to the coincidence gates 27. The number of stages of the counter 53 that might be connected in parallel for controlling each gating function may vary considerably and is determined by the rate at which the counter 53 is stepped taken in conjunction with the time required for each operation.

The group of gates 28 and 28' serve an additional function in this embodiment of the invention in that not only are they utilized for selecting a particular set of photocells 25 but further they are employed as write gates; that is, they allow writing of the information developed by the photocells 25 only during a particular portion of the cycle of operation as determined by the broken ring counter 53. All of the coincidence circuits are primed by the pulses appearing on lead 52 but only those gates which are selected by the converters 32 and 33 actually pass the pulses developed by the photocells 25. The additional function of the coincidence circuits as write gates is required in a system employing serial feed to the converters 32 and 33 since the leads 34 and 35 selected during the interval between receipt of the first and last pulse by the converters 32 and 33 bear no relationship to the final number determined by all of the pulses. Consequently, the gates 28 and 28' must be inhibited until all pulses are received by the converters so that only the correct number is recorded.

Although the counter 53 is illustrated and described as a broken ring counter, a ring counter may also be utilized. The utilization of a broken ring counter is preferable, however, inasmuch as if the counter falls out of step for any reason during a cycle of operation, it is re-synchronized with the remainder of the system at the end of each counting interval by reset pulses applied to the lead 57. As pointed out with respect to the embodiment illustrated in Figure 2, the synchronizing pulses appearing on the lead 59 serve to maintain the cylinder 18 in step with the electronic circuitry of the system so that the writing pulses developed by the photocells 25 occur at appropriately timed intervals in the cyclic operation of the electronic circuitry.

Additional modifications in the circuitry may be made within the scope of the present invention. Thus, the source of binary coded pulses may develop serially arranged coded pulses on a single lead. This type of source may be utilized by providing a serio-to-parallel converter between the source and the converters so that the pulses may be distributed on a parallel group of leads, such as the leads 37 and 48 although the pulses remain distributed serially timewise. The clock pulse sources 46 and 56, illustrated respectively in Figures 2 and 3, normally do not constitute a part of the system of the present invention since sources of appropriately timed pulses are conventionally available from the apparatus from which the symbol writing generator of the present invention is adapted to receive information. As an example, the symbol writing generator may receive information from a digital computer and the pulses necessary for application to the leads 55, 57, 58 and 59 are normally available from the computer.

While I have described and illustrated several specific embodiments of the present invention, it will be clear that variations of the specific details of contsruction may be resorted to without departing from the true spirit of the invention as defined in the appended claims.

What I claim is:

1. A recording system for recording symbols on a moving record medium wherein the recorded symbols include a plurality of visual indications arranged at the intersections of a predetermined number of rows and columns of a symbol raster, the pattern produced by the location of visual indications at various intersections of the rows and columns of the symbol raster defining the recorded symbol, and wherein the rows of the raster lie generally transverse to the direction of movement of the record medium, said recording system, comprising a row of record medium marking members equal in number to the number of columns of the symbol raster, a source of electrical signals for selectively energizing said marking members, said source including an element having at least one group of detectable indications arranged in rows and columns of a recording raster geometrically similar to the symbol raster, at least one group of means for sensing the detectable indications, said group of sensing means providing one sensing means for sensing the detectable indications of each column of the latter recording raster, power means for producing relative movement between said element and said means for sensing, said sensing means being adapted and arranged to sense substantially simultaneously all of the detectable indications of each row of the recording raster and sequentially and successively sensing the rows of the recording raster, each of said sensing means producing an electrical signal upon detection of a detectable indication, means connecting each of said sensing means to energize a different one of said record medium marking members, at least one group of normally blocked gate means for preventing application of the electrical signals to said record medium marking members, and means for simultaneously unblocking all of said gate means of said group of gate means to permit application of the electrical signals to said record medium marking members.

2. The combination in accordance with claim 1 wherein said element is provided with a plurality of groups of detectable indications, the combination further including a plurality of groups of sensing means each for detecting a different group of detectable indications, a plurality of groups of gate means, there being a one-to-one correspondence between said groups of gate means and said groups of sensing means, means connecting the sensing means for sensing corresponding columns of the groups of detectable indications to the same record medium marking member, each group of gate means controlling the application of electrical signals to said marking members from a distinct group of sensing means and means for selectively unblocking said groups of gate means in accordance with the symbol to be recorded.

3. The combination in accordance with claim 2 wherein said means for selectively unblocking said groups of gate means comprises a plurality of circuit means for applying unblocking voltages to said gate means, each of said circuits being connected to all of the gate means of a different group of gate means, and selector means for generating an unblocking voltage in the circuit means associated with the detectable indications representative of the symbol to be recorded.

4. The combination in accordance with claim 2 wherein said last mentioned means comprises converter means for generating a voltage selectively on one of a plurality of leads in accordance with a pulse code representation of a symbol to be recorded, each of said leads being connected to unblock a distinct group of gate means upon the generation of a voltage thereon.

5. The combination in accordance with claim 4 including a further sensing means for sensing a further detectable indication on said element and arranged thereon so as to be sensed by said further sensing means during an interval when no detectable indications can be sensed by said sensing means, and means for connecting said further sensing means to reset said converter means to generate a voltage on a selected one of said leads.

6. The combination in accordance with claim 5 further including a source of coded voltage pulses indicative of a symbol to be recorded, means for supplying said coded voltage pulses to said converter means, said last mentioned means being normally blocked to prevent the application of the coded pulses to said converter means and means responsive to the appearance of a voltage on said selected one of said leads to unblock said means for supplying.

7. The combination in accordance with claim 5 further comprising a source of colded voltage pulses indicative of a symbol to be recorded, means for supplying said code voltage pulses to said converter means, said last mentioned means being normally blocked to prevent the application of the coded voltage pulses to said converter means and means synchronized with energization of said further sensing means for unblocking said means for supplying.

8. The combination in accordance with claim 7 wherein said means for synchronizing comprises a counter having a number of stages greater in number than the number of rows of the rasters, a number of consecutive stages of said counter being connected to a common lead, means connecting said common lead to apply gating voltages to all of said gate means associated with said converters.

9. The combination in accordance with claim 2 wherein said element comprises an opaque hollow cylinder, and wherein said detectable indications are transparent areas of said cylinder and sensing means are photoelectric means.

10. The combination in accordance with claim 1 further comprising a plurality of collinear rows of record medium marking members, a distinct group of normally blocked gate means associated with each of said rows of marking members, a lead connecting each of said sensing means to corresponding gate means in each of said groups of gate means and distinct means for selectively unblocking each of said groups of gate means.

11. A recording system for recording symbols on a moving record medium wherein the recorded symbols include a plurality of visual indications arranged at the intersections of a predetermined number of rows and columns of a symbol raster, the pattern produced by the location of visual indications at various intersections of the rows and columns of the symbol raster defining the recorded symbol, and wherein the rows of the raster lie generally transverse to the direction of movement of the record medium, said recording system, comprising, a plurality of collinear rows of record medium marking members, each row having a number of marking members equal to the number of columns of the symbol raster, a source of electrical signals for selectively energizing said marking members, said source including, an element having a plurality of groups of detectable indications being arranged at the intersection of a plurality of rows and columns of distinct record rasters geometrically similar to the symbol raster, a plurality of groups of sensing means for sensing said detectable indications, there being one group of sensing means for each of said groups of detectable indications and one sensing means for each of the columns of the record raster, power means for producing relative movement between said element and said means for sensing, said sensing means being adapted and arranged to sense substantially simultaneously all of the detectable indications of each row of the raster and sequentially and successively sense the rows of the rasters, each of said sensing means producing an electrical signal upon detection of a detectable indication, means connecting each of said sensing means to energize a different one of said record medium marking members, a plurality of arrays of normally blocked gate means for preventing the application of the electrical signals to said marking members, each of said arrays having a plurality of groups of gate means equal to the number of groups of detectable indications on said element and each group of gate means having a number of gate means equal to the number of columns of the second raster, each group of sensing means being connected to a distinct group of gate means in each of said arrays, means connecting each gate means of each group to a distinct marking member of its associated group of marking members and connecting corresponding gate means of each group to the same marking member and means connecting each group of said gate means of an array to a different group of sensing means, each gate means of a group being connected to the sensing means for sensing the column of the record raster corresponding to the column of the symbol raster in which the marking member to which it is connected is arranged, and corresponding groups of gate means in said arrays being connected to the same group of sensing means and distinct means for simultaneously unblocking one of said group of gate means in each of said arrays.

12. A recording system for recording symbols on a moving record medium wherein the recorded symbols include a plurality of visual indications arranged at the intersections of a predetermined number of rows and columns of a symbol raster, the pattern produced by the location of visual indications at various intersections of the rows and columns of the symbol raster defining the recorded symbol, and wherein the rows of the raster lie generally transverse to the direction of movement of the record medium, said recording system, comprising, a row of record medium marking members, a source of patterns of voltage pulses for energizing said marking members to record sequentially and successively each row of the symbol raster, said source including a plurality of distinctive sources of voltage patterns, one for each symbol which may be recorded during transmission and gate means for selectively gating a voltage pattern deriving from a particular one of said plurality of distinct sources of voltage patterns to said marking members indicative of the symbol to be recorded.

13. The combination in accordance with claim 12 further comprising a plurality of collinear rows of marking members, and a plurality of gate means for gating patterns of voltage pulses selectively to each of said rows of marking members.

14. The combination in accordance with claim 12 wherein said source of patterns of voltages comprises a plurality of groups of detectable indications, each of said groups being selectively arranged at the intersections of rows and columns of a second raster geometrically similar to the symbol raster.

References Cited in the file of this patent

UNITED STATES PATENTS

| | | |
|---|---|---|
| Re. 23,713 | Hunt | Sept. 22, 1953 |
| 2,123,459 | Andersen | July 12, 1938 |
| 2,198,248 | Hansell | Apr. 23, 1940 |
| 2,365,458 | Deloraine | Dec. 19, 1944 |
| 2,457,133 | Deloraine | Dec. 28, 1948 |
| 2,679,035 | Daniels et al. | May 18, 1954 |